(12) United States Patent
Line et al.

(10) Patent No.: US 9,193,284 B2
(45) Date of Patent: Nov. 24, 2015

(54) ARTICULATING CUSHION BOLSTER FOR INGRESS/EGRESS

(71) Applicant: Ford Global Technologies, LLC, Dearborn, MI (US)

(72) Inventors: Johnathan Andrew Line, Northville, MI (US); Marc Kondrad, Macomb Township, MI (US); John W. Jaranson, Dearborn, MI (US); Christian J. Hosbach, Allen Park, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 195 days.

(21) Appl. No.: 13/914,666

(22) Filed: Jun. 11, 2013

(65) Prior Publication Data
US 2014/0361571 A1 Dec. 11, 2014

(51) Int. Cl.
*B60N 2/44* (2006.01)
*B60N 2/02* (2006.01)

(52) U.S. Cl.
CPC .............. *B60N 2/449* (2013.01); *B60N 2/0244* (2013.01)

(58) Field of Classification Search
CPC .................................. B60N 2/449; B60N 2/02
USPC ............... 296/65.01; 297/284.9, 284.1–284.8
See application file for complete search history.

(56) References Cited

U.S. PATENT DOCUMENTS

| | | |
|---|---|---|
| 2,958,369 A | 11/1960 | Pitts et al. |
| 3,403,938 A | 10/1968 | Cramer et al. |
| 3,929,374 A | 12/1975 | Hogan et al. |
| 4,324,431 A | 4/1982 | Murphy et al. |
| 4,334,709 A | 6/1982 | Akiyama et al. |
| 4,353,595 A | 10/1982 | Kaneko et al. |
| 4,541,669 A | 9/1985 | Goldner |
| 4,629,248 A | 12/1986 | Mawbey |
| 4,720,141 A | 1/1988 | Sakamoto et al. |

(Continued)

FOREIGN PATENT DOCUMENTS

| | | |
|---|---|---|
| EP | 0670240 A1 | 9/1995 |
| EP | 0754590 | 1/1997 |

(Continued)

OTHER PUBLICATIONS

Car Reviews, "Audi A4 saloon RS4," http://www.theaa.com/allaboutcars/cartestreports/2006037.html, Apr. 2006 (5 pages).

(Continued)

*Primary Examiner* — Glenn Dayoan
*Assistant Examiner* — Melissa A Black
(74) *Attorney, Agent, or Firm* — Vichit Chea; Price Heneveld LLP (57) ABSTRACT

A vehicle seating assembly having a seat base and a seat back. Bolsters extend laterally from one of the seat base and the seat back and include a bolster support having a hinge assembly and an abutment member and a substantially planar engagement surface disposed therebetween. A flexible cushion overlies the bolster support. A spring-biased dynamic member is operably coupled with one of the seat back and the seat base and is slidably engaged with the substantially planar engagement surface. The spring-biased dynamic member is operable between articulated and unarticulated positions. The spring-biased dynamic member moves to the articulated position upon initiation of a user-initiated event.

19 Claims, 4 Drawing Sheets

(56) References Cited

U.S. PATENT DOCUMENTS

| | | | |
|---|---|---|---|
| 4,915,447 A | 4/1990 | Shovar |
| 5,171,062 A | 12/1992 | Courtois |
| 5,174,526 A | 12/1992 | Kanigowski |
| 5,320,409 A | 6/1994 | Katoh et al. |
| 5,518,294 A | 5/1996 | Ligon, Sr. et al. |
| 5,560,681 A | 10/1996 | Dixon et al. |
| 5,647,635 A | 7/1997 | Aumond et al. |
| 5,658,050 A | 8/1997 | Lorbiecki |
| 5,755,493 A | 5/1998 | Kodaverdian |
| 5,769,489 A | 6/1998 | Dellanno |
| 5,826,938 A | 10/1998 | Yanase et al. |
| 5,836,648 A | 11/1998 | Karschin et al. |
| 5,902,014 A | 5/1999 | Dinkel et al. |
| 5,913,568 A | 6/1999 | Brightbill et al. |
| 5,951,039 A | 9/1999 | Severinski et al. |
| 6,024,406 A | 2/2000 | Charras et al. |
| 6,062,642 A | 5/2000 | Sinnhuber et al. |
| 6,088,642 A | 7/2000 | Finkelstein et al. |
| 6,145,925 A | 11/2000 | Eksin et al. |
| 6,155,593 A | 12/2000 | Kimura et al. |
| 6,179,379 B1 | 1/2001 | Andersson |
| 6,189,966 B1 | 2/2001 | Faust et al. |
| 6,196,627 B1 | 3/2001 | Faust et al. |
| 6,206,466 B1 | 3/2001 | Komatsu |
| 6,217,062 B1 | 4/2001 | Breyvogel et al. |
| 6,220,661 B1 | 4/2001 | Peterson |
| 6,224,150 B1 | 5/2001 | Eksin et al. |
| 6,296,308 B1 | 10/2001 | Cosentino et al. |
| 6,312,050 B1 | 11/2001 | Eklind |
| 6,364,414 B1 | 4/2002 | Specht |
| 6,375,269 B1 | 4/2002 | Maeda et al. |
| 6,394,546 B1 | 5/2002 | Knoblock et al. |
| 6,454,353 B1 | 9/2002 | Knaus |
| 6,523,892 B1 | 2/2003 | Kage et al. |
| 6,550,856 B1 | 4/2003 | Ganser et al. |
| 6,565,150 B2 | 5/2003 | Fischer et al. |
| 6,619,605 B2 | 9/2003 | Lambert |
| 6,629,715 B2 | 10/2003 | Oh et al. |
| 6,672,666 B2 | 1/2004 | Stiller et al. |
| 6,682,140 B2 | 1/2004 | Minuth et al. |
| 6,695,406 B2 | 2/2004 | Plant |
| 6,698,832 B2 | 3/2004 | Boudinot |
| 6,736,452 B2 | 5/2004 | Aoki et al. |
| 6,758,522 B2 | 7/2004 | Ligon, Sr. et al. |
| 6,808,230 B2 | 10/2004 | Buss et al. |
| 6,824,212 B2 | 11/2004 | Malsch et al. |
| 6,848,742 B1 | 2/2005 | Aoki et al. |
| 6,860,559 B2 | 3/2005 | Schuster, Sr. et al. |
| 6,860,564 B2 | 3/2005 | Reed et al. |
| 6,866,339 B2 | 3/2005 | Itoh |
| 6,869,140 B2 | 3/2005 | White et al. |
| 6,890,029 B2 | 5/2005 | Svantesson |
| 6,912,748 B2 | 7/2005 | VanSickle |
| 6,938,953 B2 | 9/2005 | Håland et al. |
| 6,955,399 B2 | 10/2005 | Hong |
| 6,962,392 B2 | 11/2005 | O'Connor |
| 6,988,770 B2 | 1/2006 | Witchie |
| 6,997,473 B2 | 2/2006 | Tanase et al. |
| 7,040,699 B2 | 5/2006 | Curran et al. |
| 7,100,992 B2 | 9/2006 | Bargheer et al. |
| 7,125,077 B2 | 10/2006 | Frank |
| 7,131,694 B1 | 11/2006 | Buffa |
| 7,159,934 B2 | 1/2007 | Farquhar et al. |
| 7,185,950 B2 | 3/2007 | Pettersson et al. |
| 7,213,876 B2 | 5/2007 | Stoewe |
| 7,229,118 B2 | 6/2007 | Saberan et al. |
| 7,261,371 B2 | 8/2007 | Thunissen et al. |
| 7,344,189 B2 | 3/2008 | Reed et al. |
| 7,350,859 B2 | 4/2008 | Klukowski |
| 7,393,005 B2 | 7/2008 | Inazu et al. |
| 7,425,034 B2 | 9/2008 | Bajic et al. |
| 7,441,838 B2 | 10/2008 | Patwardhan |
| 7,467,823 B2 | 12/2008 | Hartwich |
| 7,478,869 B2 | 1/2009 | Lazanja et al. |
| 7,481,489 B2 | 1/2009 | Demick |
| 7,506,924 B2 | 3/2009 | Bargheer et al. |
| 7,506,938 B2 | 3/2009 | Brennan et al. |
| 7,530,633 B2 | 5/2009 | Yokota et al. |
| 7,543,888 B2 | 6/2009 | Kuno |
| 7,578,552 B2 | 8/2009 | Bajic et al. |
| 7,597,398 B2 | 10/2009 | Lindsay |
| 7,614,693 B2 | 11/2009 | Ito |
| 7,641,281 B2 | 1/2010 | Grimm |
| 7,669,925 B2 | 3/2010 | Beck et al. |
| 7,669,928 B2 | 3/2010 | Snyder |
| 7,712,833 B2 | 5/2010 | Ueda |
| 7,717,459 B2 | 5/2010 | Bostrom et al. |
| 7,726,733 B2 | 6/2010 | Balser et al. |
| 7,735,932 B2 | 6/2010 | Lazanja et al. |
| 7,752,720 B2 | 7/2010 | Smith |
| 7,753,451 B2 | 7/2010 | Maebert et al. |
| 7,775,602 B2 | 8/2010 | Lazanja et al. |
| 7,784,863 B2 | 8/2010 | Fallen |
| 7,802,843 B2 | 9/2010 | Andersson et al. |
| 7,819,470 B2 | 10/2010 | Humer et al. |
| 7,823,971 B2 | 11/2010 | Humer et al. |
| 7,845,729 B2 | 12/2010 | Yamada et al. |
| 7,857,381 B2 | 12/2010 | Humer et al. |
| 7,871,126 B2 | 1/2011 | Becker et al. |
| 7,891,701 B2 | 2/2011 | Tracht et al. |
| 7,909,360 B2 | 3/2011 | Marriott et al. |
| 7,909,403 B2 * | 3/2011 | Lawall et al. .............. 297/284.9 |
| 7,931,294 B2 | 4/2011 | Okada et al. |
| 7,931,330 B2 | 4/2011 | Itou et al. |
| 7,946,649 B2 | 5/2011 | Galbreath et al. |
| 7,963,553 B2 | 6/2011 | Huynh et al. |
| 7,963,595 B2 | 6/2011 | Ito et al. |
| 7,963,600 B2 | 6/2011 | Alexander et al. |
| 7,971,931 B2 | 7/2011 | Lazanja et al. |
| 7,971,937 B2 | 7/2011 | Ishii et al. |
| 8,011,726 B2 | 9/2011 | Omori et al. |
| 8,016,355 B2 | 9/2011 | Ito et al. |
| 8,029,055 B2 | 10/2011 | Hartlaub |
| 8,038,222 B2 | 10/2011 | Lein et al. |
| 8,075,053 B2 | 12/2011 | Tracht et al. |
| 8,109,569 B2 | 2/2012 | Mitchell |
| 8,123,246 B2 | 2/2012 | Gilbert et al. |
| 8,126,615 B2 | 2/2012 | McMillen et al. |
| 8,128,167 B2 | 3/2012 | Zhong et al. |
| 8,162,391 B2 | 4/2012 | Lazanja et al. |
| 8,162,397 B2 | 4/2012 | Booth et al. |
| 8,167,370 B2 | 5/2012 | Arakawa et al. |
| 8,210,568 B2 | 7/2012 | Ryden et al. |
| 8,210,605 B2 | 7/2012 | Hough et al. |
| 8,210,611 B2 | 7/2012 | Aldrich et al. |
| 8,226,165 B2 | 7/2012 | Mizoi |
| 8,342,607 B2 | 1/2013 | Hofmann et al. |
| 2004/0195870 A1 | 10/2004 | Bohlender et al. |
| 2005/0200166 A1 | 9/2005 | Noh |
| 2006/0043777 A1 | 3/2006 | Friedman et al. |
| 2007/0120401 A1 | 5/2007 | Minuth et al. |
| 2008/0174159 A1 | 7/2008 | Kojima et al. |
| 2009/0066122 A1 | 3/2009 | Minuth et al. |
| 2009/0165263 A1 | 7/2009 | Smith |
| 2009/0322124 A1 | 12/2009 | Barkow et al. |
| 2010/0038937 A1 | 2/2010 | Andersson et al. |
| 2010/0140986 A1 | 6/2010 | Sawada |
| 2010/0171346 A1 | 7/2010 | Laframboise et al. |
| 2010/0187881 A1 | 7/2010 | Fujita et al. |
| 2010/0201167 A1 | 8/2010 | Wieclawski |
| 2010/0231013 A1 | 9/2010 | Schlenker |
| 2010/0270840 A1 | 10/2010 | Tanaka et al. |
| 2010/0283229 A1 | 11/2010 | Feller et al. |
| 2010/0301650 A1 | 12/2010 | Hong |
| 2010/0320816 A1 | 12/2010 | Michalak |
| 2011/0018498 A1 | 1/2011 | Soar |
| 2011/0074185 A1 | 3/2011 | Nakaya et al. |
| 2011/0095513 A1 | 4/2011 | Tracht et al. |
| 2011/0095578 A1 | 4/2011 | Festag |
| 2011/0109127 A1 | 5/2011 | Park et al. |
| 2011/0109128 A1 | 5/2011 | Axakov et al. |
| 2011/0121624 A1 | 5/2011 | Brncick et al. |
| 2011/0133525 A1 | 6/2011 | Oota |
| 2011/0163574 A1 | 7/2011 | Tame et al. |

(56) References Cited

U.S. PATENT DOCUMENTS

| | | |
|---|---|---|
| 2011/0163583 A1 | 7/2011 | Zhong et al. |
| 2011/0186560 A1 | 8/2011 | Kennedy et al. |
| 2011/0187174 A1 | 8/2011 | Tscherbner |
| 2011/0254335 A1 | 10/2011 | Pradier et al. |
| 2011/0260506 A1 | 10/2011 | Kuno |
| 2011/0272548 A1 | 11/2011 | Rudkowski et al. |
| 2011/0272978 A1 | 11/2011 | Nitsuma |
| 2011/0278885 A1 | 11/2011 | Procter et al. |
| 2011/0278886 A1 | 11/2011 | Nitsuma |
| 2011/0298261 A1 | 12/2011 | Holt et al. |
| 2012/0032486 A1 | 2/2012 | Baker et al. |
| 2012/0037754 A1 | 2/2012 | Kladde |
| 2012/0063081 A1 | 3/2012 | Grunwald |
| 2012/0080914 A1 | 4/2012 | Wang |
| 2012/0091695 A1 | 4/2012 | Richez et al. |
| 2012/0091766 A1 | 4/2012 | Yamaki et al. |
| 2012/0091779 A1 | 4/2012 | Chang et al. |
| 2012/0109468 A1 | 5/2012 | Baumann et al. |
| 2012/0119551 A1 | 5/2012 | Brncick et al. |
| 2012/0125959 A1 | 5/2012 | Kucera |
| 2012/0127643 A1 | 5/2012 | Mitchell |
| 2012/0129440 A1 | 5/2012 | Kitaguchi et al. |
| 2012/0162891 A1 | 6/2012 | Tranchina et al. |
| 2012/0175924 A1 | 7/2012 | Festag et al. |
| 2012/0187729 A1 | 7/2012 | Fukawatase et al. |
| 2012/0248833 A1 | 10/2012 | Hontz et al. |
| 2012/0261974 A1 | 10/2012 | Yoshizawa et al. |
| 2013/0076092 A1 | 3/2013 | Kulkarni et al. |

FOREIGN PATENT DOCUMENTS

| | | |
|---|---|---|
| EP | 0926969 | 1/2002 |
| EP | 1266794 | 3/2004 |
| EP | 1123834 | 10/2004 |
| EP | 1050429 | 10/2005 |
| EP | 1084901 | 6/2006 |
| EP | 1674333 | 8/2007 |
| EP | 1950085 | 12/2008 |
| EP | 1329356 | 11/2009 |
| GB | 2403139 A | 12/2004 |
| JP | 2009096422 A | 5/2009 |
| JP | 201178557 A | 4/2011 |
| WO | WO9511818 | 5/1995 |
| WO | WO9958022 | 11/1999 |
| WO | WO2006131189 | 12/2006 |
| WO | WO2007028015 | 8/2007 |
| WO | 2008019981 A1 | 2/2008 |
| WO | WO2008073285 | 6/2008 |
| WO | WO2011021952 | 2/2011 |
| WO | WO2012008904 | 1/2012 |

OTHER PUBLICATIONS

Recaro GmbH & Co. KG, "Seat Range," ID No. 7218054, Mar. 2010 (21 pages).

Kelly Blue Book, "2011 Mercedes-Benz CL-Class," http://www.kbb.com/mercedes-benz/cl-class/2011-mercedes-benz-cl-class/, Feb. 28, 2013 (5 pages).

Lexus, "The all-new Lexus 2013," lexus.com P2-332, Feb. 2012 (13 pages).

Mercedes-Benz, "Interior comfort—spoilt for choice," http://www.zungfu.com/pc_E_saloon.comfort.1.shtml, Feb. 28, 2013 (3 pages).

M. Grujicic et al., "Seat-cushion and soft-tissue material modeling and a finite element investigation of the seating comfort for passenger-vehicle occupants," Materials and Design 30 (2009) 4273-4285.

"Thigh Support for Tall Drivers," http://cars.about.com/od/infiniti/ig/2009-Infiniti-G37-Coupe-pics/2008-G37-cpe-thigh-support.htm (1 page).

Mladenov, "Opel Insignia Receives Seal of Approval for Ergonomic Seats," Published Aug. 27, 2008, http://www.automobilesreview.com/auto-news/opel-insignia-receives-seal-of-approval-for-ergonomic-seats/4169/ (2 pages).

Brose India Automotive Systems, "Adaptive Sensor Controlled Headrest," http://www.indiamart.com/broseindiaautomotivesystems/products.html, Oct. 9, 2012 (12 pages).

eCOUSTICS.com, "Cineak Motorized Articulating Headrest Preview," http://www.ecoustics.com/ah/reviews/furniture/accessories/cineak-motorized-headrest, Oct. 9, 2012 (3 pages).

"'Performance' Car Seat Eliminates Steel," Published in Plastics News—Indian Edition Plastics & Polymer News, (http://www.plasticsinfomart.com/performance-car-seat-eliminates-steel/), Jan. 2012, 3 pages.

"Frankfurt 2009 Trend—Light and Layered." by Hannah Macmurray, Published in GreenCarDesign, (http://www.greencardesign.com/site/trends/00138-frankfurt-2009-trend-light-and-layered), Sep. 2009, 9 pages.

"Imola Pro-fit", Cobra, (http://cobra.subesports.com/products/cat/seats/brand/Cobra/prodID/656), Date unknown, 2 pages.

* cited by examiner

ARTICULATING CUSHION BOLSTER FOR INGRESS/EGRESS

FIELD OF THE INVENTION

The present invention generally relates to a vehicle seating assembly, and more particularly to a vehicle seating assembly with an articulating cushion bolster for ingress/egress.

BACKGROUND OF THE INVENTION

Bolsters are known to provide support to the back and legs of vehicle passengers. Dynamic bolsters provide versatile seating arrangements to aid passengers entering and leaving a vehicle.

SUMMARY OF THE INVENTION

One aspect of the present invention includes a vehicle seating assembly having a seat base and a seat back. Bolsters extend laterally from one of the seat base and the seat back and include a bolster support having a hinge assembly, an abutment member, and a substantially planar engagement surface disposed therebetween. A flexible cushion overlies the bolster support. A spring-biased dynamic member is operably coupled with one of the seat back and the seat base and is slidably engaged with the substantially planar engagement surface. The spring-biased dynamic member is operable between articulated and unarticulated positions. The spring-biased dynamic member moves to the articulated position upon initiation of a user-initiated event.

Another aspect of the present invention includes a vehicle seating assembly having bolsters extending laterally from one of a seat base and a seat back and including a bolster support. A flexible cushion overlies the bolster support. A spring-biased dynamic member is slidably engaged with the bolster support and is moveable to an articulated position when the seat base receives a predetermined load and moveable to an unarticulated position when the seat base is absent a predetermined load.

Yet another aspect of the present invention includes a vehicle seating assembly having a vehicle door configured to be opened and closed. Bolsters extend laterally from one of a seat base and a seat back and include a bolster support. A flexible cushion overlies the bolster support. A spring-biased dynamic member is slidably engaged with the bolster support and is moveable to an unarticulated position when the vehicle door is opened and an articulated position when the vehicle door is closed.

Yet another aspect of the present invention includes a vehicle seating assembly having a plurality of bolsters extending laterally from at least one of the seat base, the seat back, or the upper seat back. The bolsters begin in the unarticulated position and upon initiation of a predetermined event, such as a door opening, the bolsters move to an articulated position. The articulated position moves the bolsters downward. In the articulated position, the bolsters are easier to traverse during ingress/egress and allows a vehicle passenger to slide easily into or out of the vehicles seating assembly. This function of the bolsters is especially helpful for older or disabled vehicle passengers who have difficulty entering and exiting the vehicle. Upon initiation of a subsequent user-initiated event, such as the door closing, the bolsters move back to the unarticulated position. In this position, the bolsters come into abutting contact with the buttocks or back of a vehicle passenger and provide adequate support for the vehicle passenger while the vehicle is in motion.

These and other aspects, objects, and features of the present invention will be understood and appreciated by those skilled in the art upon studying the following specification, claims, and appended drawings.

DETAILED DESCRIPTION OF THE EMBODIMENTS

Figure 1:
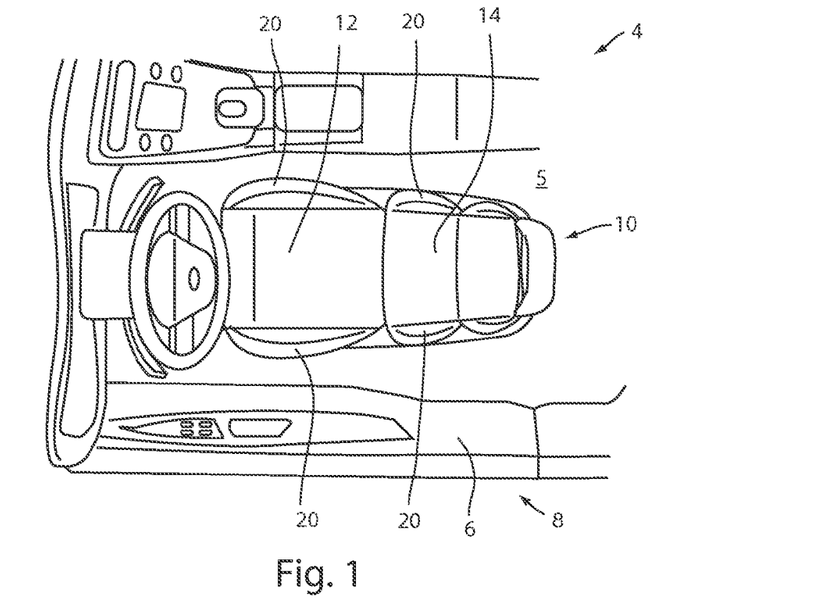
FIG. 1 is a top plan view of a vehicle seating assembly according to the present invention with bolster supports in an articulated position.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIGS. 1-5, reference numeral 10 generally designates a vehicle seating assembly having a seat base 12 and a seat back 11. Bolsters 20 extend laterally from the seat base 12 and the seat back 11 and include a bolster support 22 having an abutment member 26 and a substantially planar engagement surface 28 adjacent thereto. A flexible cushion 23 overlies the bolster support 22. A spring-biased dynamic member 30 is operably coupled with a lower seat back 14 and the seat base 12 and is slidably engaged with the substantially planar engagement surface 28. The spring-biased dynamic member 30 is operable between an articulated position 36 and an unarticulated position 34. The spring-biased dynamic member 30 moves to the articulated position 36 upon the start of a user-initiated event 40.

Figure 2:
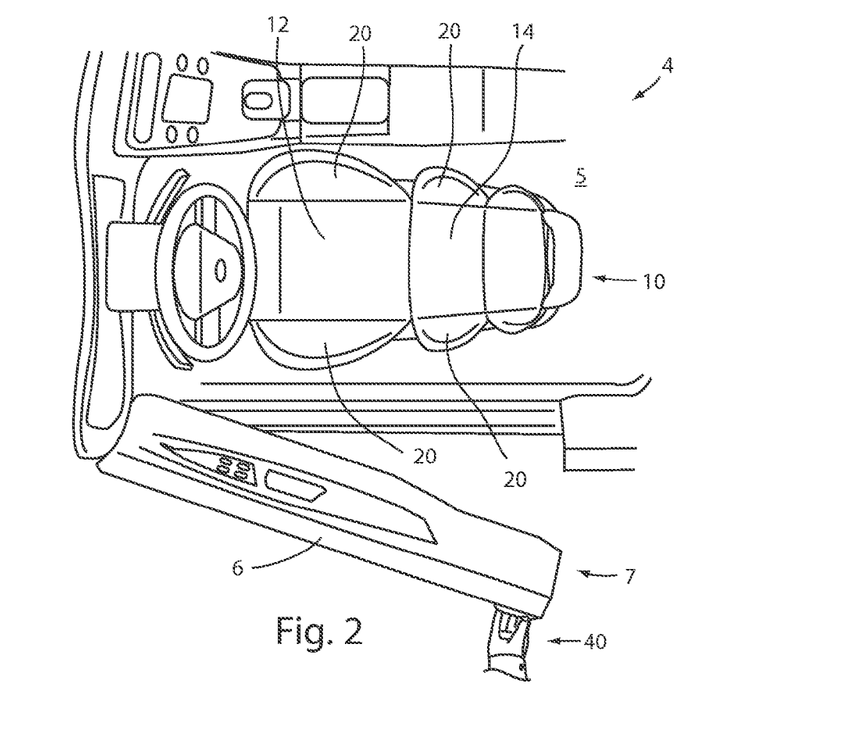
FIG. 2 is a top plan view of the vehicle seating assembly of FIG. 1 with bolster supports in an unarticulated position.
Figure 3:
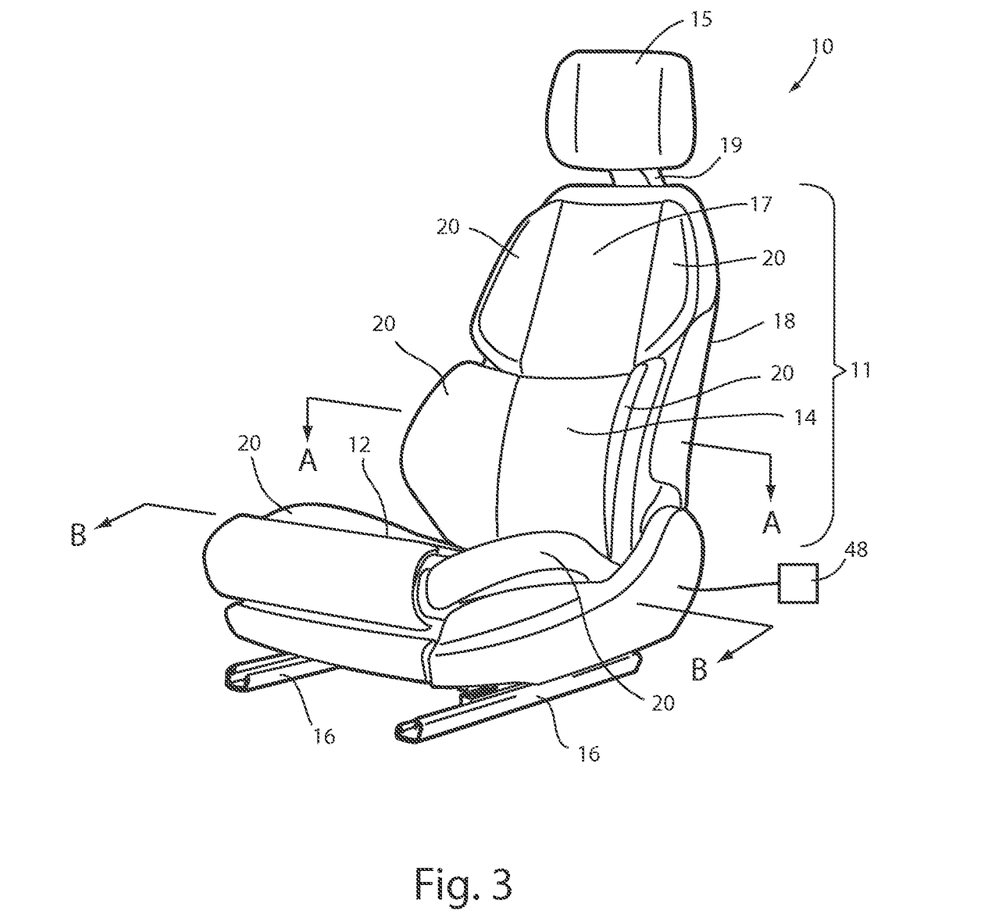
FIG. 3 is a side perspective view of a vehicle seating assembly according to the present invention.

Referring again to FIGS. 1 and 2, a portion of a vehicle 4 having a vehicle interior 5 that includes the vehicle seating assembly 10 is shown. The vehicle seating assembly 10 may be a front seat of a driver side, a front seat of a passenger side, or a rear vehicle seat. The vehicle 4 also includes a vehicle door 6, which is capable of being in an open position 7, as shown in FIG. 2, or a closed position 8, as shown in FIG. 1. The vehicle seating assembly 10 includes the seat base 12, the seat back 11, a seat back surface 18, and the bolsters 20. The seat back 11 includes an upper seat back 17, and the lower seat back 14. Moreover, the vehicle seating assembly 10 may include a head restraint 15 operably coupled to the back surface 18 of the vehicle seating assembly 10 by a support 19. The vehicle seating assembly 10 is supported by an underlying seat structure 16. The bolsters 20 may be disposed laterally on any or all of the seat base 12, the lower seat back 14, or the upper seat back 17. Each of the seat base 12, the lower seat back 14, and the upper seat back 17 generally include at least one bolster 20. In the illustrated embodiment, the bolsters 20 extend from lateral side portions of each of the seat base 12, the lower seat back 14, and the upper seat back 17.

Figure 4:
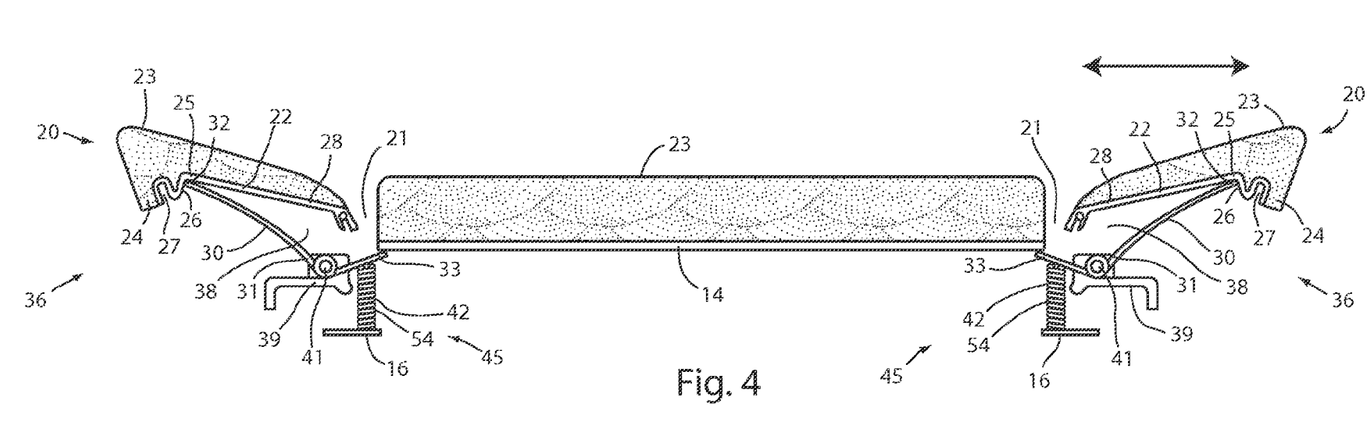
FIG. 4 is a top cross-sectional plan view taken at line A of the vehicle seating assembly of FIG. 3 in the articulated position.
Figure 5:
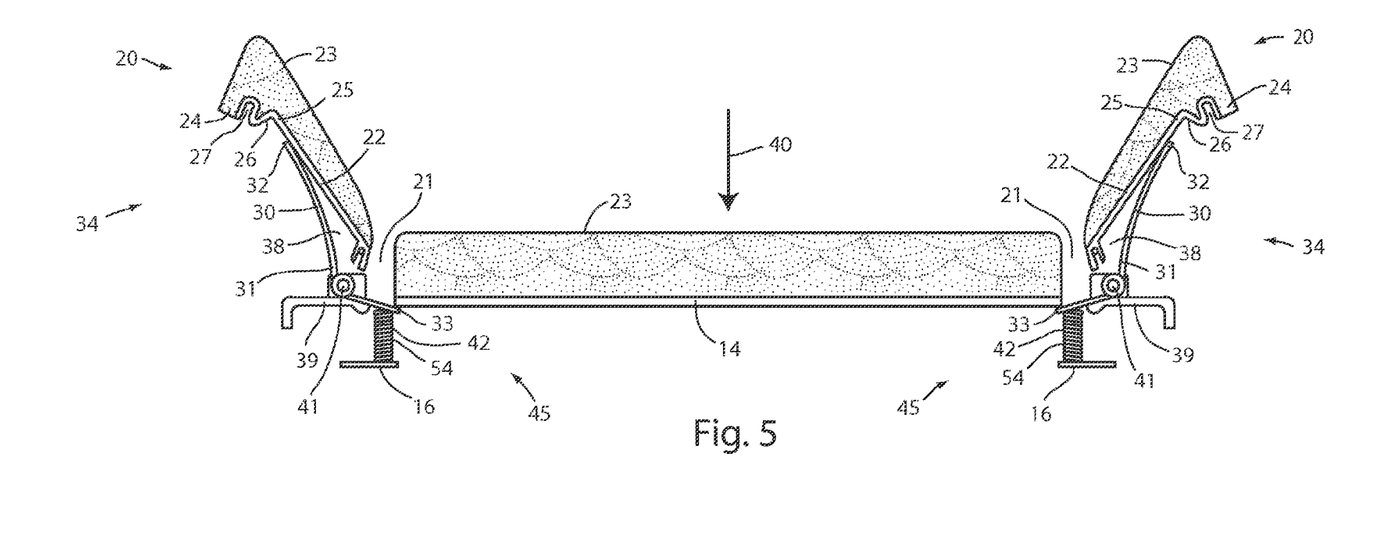
FIG. 5 is a top cross-sectional plan view taken at line A of the vehicle seating assembly of FIG. 3 in the unarticulated position.

With reference to FIGS. 4 and 5, the illustrated bolsters 20 extend laterally from the lower seat back 14. However, it will be understood that this same embodiment for the bolsters 20 could also be utilized on the upper seat back 17. The bolsters 20 include the bolster support 22 and the abutment member 26. The bolster support 22 is generally a linear support member having a non-linear portion on a distal end 25. The linear portion of the bolster support 22 includes the substantially planar engagement surface 28. The non-linear portion of the bolster support 22 includes the abutment member 26 and an abutment space 27. The substantially planar engagement surface 28 is disposed adjacent to the abutment member 26. The bolster support 22, the substantially planar engagement surface 28, and the abutment member 26 are generally made of a plastic polymer material, which is configured to support the weight of a passenger during vehicle occupancy. A more sturdy material, such as steel, may also be used in certain applications.

Referring again to the embodiment illustrated in FIGS. 4 and 5, the flexible cushion 23 is stretched over the bolster support 22 in order to provide comfort to a seated vehicle passenger. The flexible cushion 23 is similar in material and feel to an open or closed cell cushion or spacer material, which generally overlies a typical vehicle seating assembly. The flexible cushion 23 absorbs energy and impact forces from a passenger and transfers some of those forces and energy to the underlying bolster support 22. The flexible cushion 23 may also be disposed over the seat base 12, the lower seat back 14, and/or the upper seat back 17 in order to provide the same look and feel throughout the entire vehicle seating assembly 10.

Referring again to the embodiment shown in FIGS. 4 and 5, the bolsters 20 include an articulation feature 45, which is configured to move the spring-biased dynamic member 30 from the unarticulated position 34 (FIG. 5) to the articulated position 36 (FIG. 4). The articulation feature 45 may include a variety of constructions, including, but not limited to, a spring assembly 42, such as a torsion spring 52 (FIGS. 5-7), or a coil spring 54 (FIGS. 4 and 5). The articulation feature 45 may be operated by a vehicle bus 48 (FIG. 3), which monitors speed and steering of the vehicle 4, in order to fully or partially activate the articulation feature 45 when a predetermined speed and/or steering movement and/or user-initiated event 40 has been satisfied by the vehicle bus 48.

The embodiment of FIGS. 4 and 5 shows the dynamic member 30 operably coupled with the substantially planar engagement surface 28 and a stationary member 39. As illustrated, the dynamic member 30 is a generally arcuate member having a proximal end 31 and a distal end 32. The distal end 32 is in abutting contact with the bolster support 22. The proximal end 31 is rotatably connected to the stationary member 39 at a pivot location 41. An arm 33 is connected to the dynamic member 30 and rotatably connected to the stationary member 39. In addition, the arm 33 is connected to the spring assembly 42 of the articulation feature 45. The unarticulated position 34 (FIG. 5) corresponds with the distal end 32 of the dynamic member 30 being in abutting contact with the substantially planar engagement surface 28 of the bolster support 22, but in spaced relation to the abutment member 26. The articulated position 36 (FIG. 4) corresponds with the dynamic member 30 being in abutting contact with the abutment member 26 of the bolster support 22. The abutment member 26 is the non-linear portion of the bolster support 22. The abutment member 26 is configured to provide support for the bolster 20 when the bolster 20 is in the articulated position 36. A spacer gap 38 is defined by the void between the dynamic member 30 and the bolster support 22. In addition, the abutment member 26 defines a slot 27. The slot 27 assists the abutment member 26 in absorbing forces from the sliding dynamic member 30 when the dynamic member 30 is moved from the unarticulated position 34 (FIG. 5) to the articulated position 36 (FIG. 4). In addition, when the distal end 32 abuts the abutment member 26, additional support is provided to the bolster 20. The dynamic member 30 and the arm 33 are typically made of a strong material, such as steel, but may also be made of a strong plastic polymer or any other material strong enough to support the bolster 20. In one embodiment, the dynamic member 30 is held in the unarticulated position 34 (FIG. 5) by the articulation feature 45 until the user-initiated event 40 occurs. The user-initiated event 40 may be a vehicle door 6 opening (FIG. 2) or closing (FIG. 1), a weight sensor that senses when a weight, typically at least 80 pounds (36.3 kg), is present on the vehicle seating assembly 10, the vehicle ignition has been turned on or off, etc.

In operation, the dynamic member 30 is first held in the unarticulated position 34 by the articulation feature 45. Upon the user-initiated event 40, the articulation feature 45 is activated. In the embodiment shown in FIGS. 4 and 5, the articulation feature 45 includes the spring assembly 42. Therefore, when a user-initiated event 40 occurs, the spring 42 is released and the dynamic member 30 is drawn from the unarticulated position 34 (FIG. 5) to the articulated position 36 (FIG. 4). The dynamic member 30 operates such that when the dynamic member 30 is in the articulated position 36, the bolsters 20 are moved laterally outward in order to provide a substantially planar surface with the lower seat back 14, the seat base 12, or the upper seat back 17. When in the articulated position 36, the dynamic member 30 allows a user to easily egress and ingress the vehicle 4 by making the laterally extending bolsters 20 substantially even with the seat back 11, which removes hindrances from the vehicle seating assembly 10. Notably, the coil spring 54 may be a tension spring or a compression spring. If the coil spring 54 is a tension spring, the bolsters 20 will be biased to the unarticulated position 34. If the coil spring 54 is a compression spring, the bolsters 20 will be biased to the articulated position 36.

Figure 6:
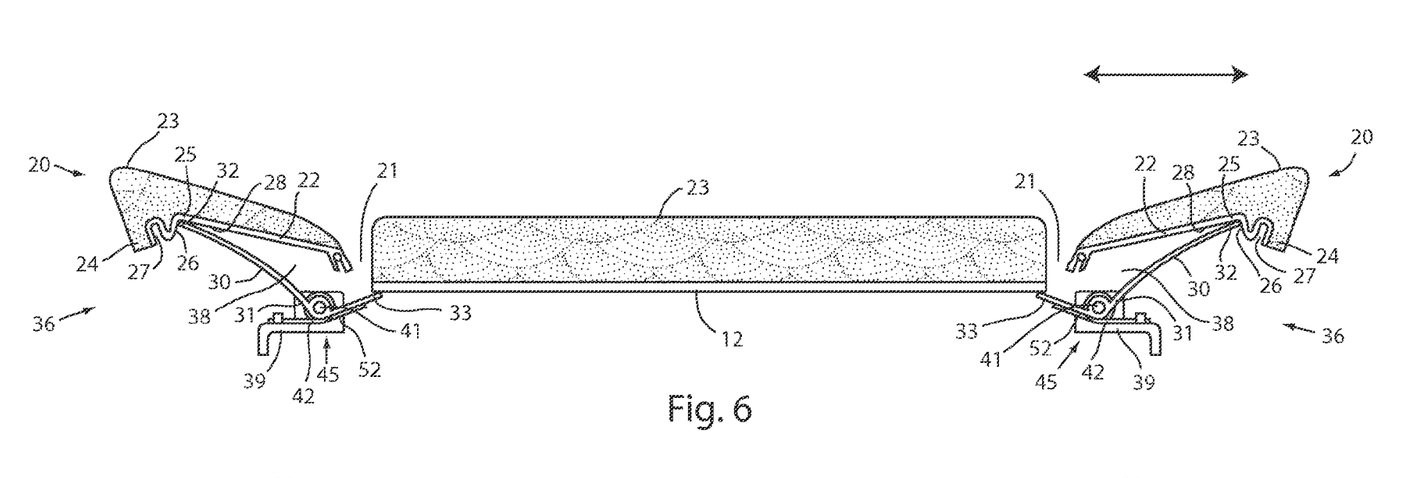
FIG. 6 is a front cross-sectional elevational view taken at line B of the vehicle seating assembly of FIG. 3 in the articulated position.
Figure 7:
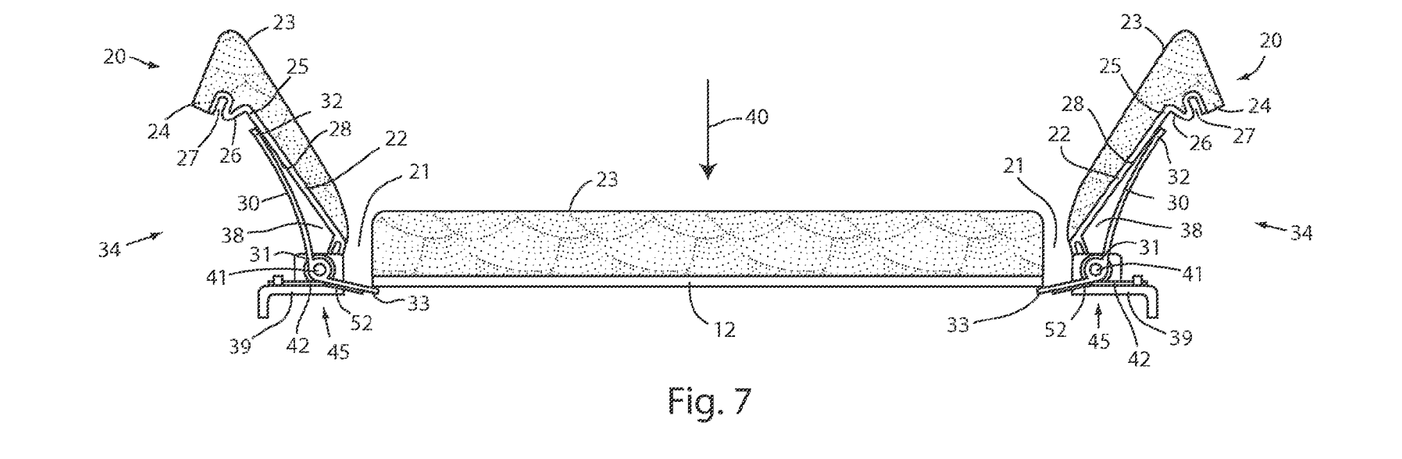
FIG. 7 is a front cross-sectional elevational view taken at line B of the vehicle seating assembly of FIG. 3 in the unarticulated position.

Referring now to the embodiment shown in FIGS. 6 and 7, the spring assembly 42 includes the torsion spring 52. The torsion spring 52 is operably coupled to the arm 33 and is disposed on the stationary member 39. In the embodiment shown in FIGS. 6 and 7, the vehicle seating assembly 10 includes the bolsters 20 extending from the seat base 12. The bolsters 20 of FIGS. 6 and 7 are disposed on the seat base 12 and include similar features to the bolsters 20 in FIGS. 4 and 5 that are disposed on the lower seat back 14 and described above. Moreover, the bolsters 20 may be disposed on the upper seat back 17. These bolsters 20 may be in addition to, or in alternative to, the bolsters 20 extending from the lower seat back 14 as shown and described in FIGS. 4 and 5.

In operation of the embodiment shown in FIGS. 6 and 7, the bolsters 20 begin in the unarticulated position 34 (FIG. 7). The unarticulated position 34 is achieved by the dynamic member 30, which is biased by the articulation member 45, specifically, the torsion spring 52. Upon initiation of the user-initiated event 40, such as the vehicle door 6 moving to the open position 7 or to the closed position 8, a load of at least 80 pounds (36.3 kg) positioned on the seat base 12, occupation or inoccupation of the seat base 12, or another predetermined event, the dynamic member 30 moves from the unarticulated position 34 (FIG. 7) to the articulated position 36 (FIG. 6). When the distal end 25 of the dynamic member 30 is in abutting contact or nearly in abutting contact with the abutment member 26, the dynamic member 30 is in the articulated position 36. When the dynamic member 30 is in the articulated position 36, the bolsters 20 are generally aligned with the seat base 12 and allow easy ingress/egress of the passenger relative to the vehicle seating assembly 10. When the dynamic member 30 is in the unarticulated position 34, the bolsters 20 are configured to come into abutting contact with the vehicle passenger in order to provide support during vehicle motion. The embodiment of FIGS. 6 and 7 otherwise includes similar components to and performs in much the same way as the embodiment illustrated in FIGS. 4 and 5.

With reference to the embodiments shown in FIGS. 4-7, the bolster support 22 and the dynamic member 30 define a spacer gap 38. The spacer gap 38 allows the bolsters 20 and the vehicle seat back 11 and/or the lower seat back 14 to be freely moveable from the unarticulated position 34 (FIGS. 5 and 7) to the articulated position 36 (FIGS. 4 and 6). The spacer gap 38 also eliminates the need for extra material and allows the vehicle seating assembly 10 to be lighter in weight. Moreover, a space 21 is disposed between the lower seat back 14 or the seat base 12 and the bolster 20. The space 21 has a defined width, which remains the same width when the bolsters 20 are in the unarticulated position 34 (FIGS. 5 and 7) as when the bolsters 20 are in the articulated position 36 (FIGS. 4 and 6).

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or moveable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited.

For example, elements shown as integrally formed may be constructed of multiple parts or elements shown in multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of the wide variety of materials that provide sufficient strength or durability, in any of the wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is to be understood that variations and modifications can be made on the aforementioned structure and methods without departing from the concepts of the present invention, and further it is to be understood that such concepts are intended to be covered by the following claims unless these claims by their language expressly state otherwise.

What is claimed is:

1. A vehicle seating assembly comprising:
   a seat base and a seat back;
   bolsters extending laterally from one of the seat base and the seat back and including:
      a bolster support having an abutment member and a substantially planar engagement surface adjacent thereto;
      a flexible cushion overlying the bolster support;
      a dynamic member operably coupled with one of the seat back and the seat base and slidably engaged with the substantially planar engagement surface, the dynamic member being operable between articulated and unarticulated positions; and
   an arm rigidly coupled with the dynamic member;
   a pivot bar disposed between the arm and the dynamic member;
   a spring assembly operably coupled with the arm and biasing the arm to rotate the dynamic member to the unarticulated position.

2. The vehicle seating assembly of claim 1, further comprising:
   a vehicle door operably coupled to the bolsters, wherein the dynamic member is also moveable to the unarticulated position when the vehicle door is opened and the articulated position when the vehicle door is closed.

3. The vehicle seating assembly of claim 1, wherein the dynamic member also moves to the articulated position when a load of at least 80 pounds (36.3 kg) is positioned on the seat base.

4. The vehicle seating assembly of claim 1, wherein the dynamic member is moveable to the articulated position when the seat base is occupied and the unarticulated position when the seat base is unoccupied.

5. The vehicle seating assembly of claim 1, further comprising:
   an underlying seat structure, wherein the dynamic member is spring-biased by a torsion spring operably coupled between a proximal end of the dynamic member and the underlying seat structure.

6. The vehicle seating assembly of claim 1, further comprising:
an underlying seat structure, wherein the dynamic member is spring-biased by a tension spring operably coupled between a proximal end of the dynamic member and the underlying seat structure.

7. A vehicle seating assembly comprising:
a bolster support having a flexible cushion disposed thereon;
a dynamic member slidably engaged with the bolster support and operably coupled with a load arm, the dynamic member and load arm being pivotable about a pivot member disposed therebetween; and
a spring member engaged with the load arm to bias the load arm, dynamic member, and bolster support to an unarticulated position.

8. The vehicle seating assembly of claim 7, further comprising:
a vehicle door operably coupled to the bolsters, wherein the dynamic member is also moveable to the unarticulated position when the vehicle door is opened and the articulated position when the vehicle door is closed.

9. The vehicle seating assembly of claim 7, wherein the dynamic member moves to an articulated position when the load is at least 80 pounds (36.3 kg).

10. The vehicle seating assembly of claim 7, wherein the dynamic member is moveable to the articulated position when the seat base is occupied by a passenger and the unarticulated position when the seat base is unoccupied by a passenger.

11. The vehicle seating assembly of claim 7, wherein the bolster support and the dynamic member define a spacer gap.

12. The vehicle seating assembly of claim 7, wherein a planar extent of the dynamic member and a planar extent of the load arm define an acute angle.

13. The vehicle seating assembly of claim 7, wherein the bolster support includes an abutment member configured to abut a distal end of the dynamic member.

14. A vehicle seating assembly comprising:
a vehicle door configured to be opened and closed;
cushioned bolsters extending from the vehicle seating assembly and including:
a bolster support;
a dynamic member rotatable about a pivot pin and rigidly coupled with a spring-biased load arm, the dynamic member being moveable to an unarticulated position when the vehicle door is opened and an articulated position against the spring-bias of the load arm when the vehicle door is closed.

15. The vehicle seating assembly of claim 14, further comprising:
an underlying seat structure supporting the seat base, wherein the load arm is spring-biased by a torsion spring operably coupled between the load arm and the underlying seat structure.

16. The vehicle seating assembly of claim 14 comprising:
an underlying seat structure supporting the base, wherein the load arm is spring-biased by a compression spring operably coupled between the load arm and the underlying seat structure.

17. The vehicle seating assembly of claim 14, wherein the bolster support and the dynamic member define a spacer gap.

18. The vehicle seating assembly of claim 14, wherein the bolster support includes an abutment member configured to abut a distal end of the dynamic member.

19. The vehicle seating assembly of claim 14, wherein the dynamic member is also moveable to the articulated position when the seat base receives a predetermined load and moveable to the unarticulated position when the seat base is absent a predetermined load.

* * * * *